(12) United States Patent
Pasquariello et al.

(10) Patent No.: US 9,696,716 B2
(45) Date of Patent: Jul. 4, 2017

(54) METHOD FOR SERIAL PERSONALIZATION OF SMART CARDS

(71) Applicant: STMICROELECTRONICS S.R.L., Agrate Brianza (IT)

(72) Inventors: Giancarlo Pasquariello, Naples (IT); Paolo Morelli, Succivo (IT); Fabio Cuomo, Naples (IT)

(73) Assignee: STMICROELECTRONICS S.R.L., Agrate Brianza (MB) (IT)

( * ) Notice: Subject to any disclaimer, the term of this patent is extended or adjusted under 35 U.S.C. 154(b) by 804 days.

(21) Appl. No.: 13/856,160

(22) Filed: Apr. 3, 2013

(65) Prior Publication Data

US 2013/0274909 A1    Oct. 17, 2013

(30) Foreign Application Priority Data

Apr. 12, 2012    (IT) .............................. MI2012A0596

(51) Int. Cl.
| | | |
|---|---|---|
| G06F 19/00 | (2011.01) | |
| G06K 5/00 | (2006.01) | |
| G06K 7/00 | (2006.01) | |
| G06K 19/06 | (2006.01) | |
| G01R 31/28 | (2006.01) | |
| H01R 43/00 | (2006.01) | |
| G06F 7/04 | (2006.01) | |
| G05B 19/418 | (2006.01) | |
| G06Q 10/00 | (2012.01) | |

(52) U.S. Cl.
CPC ....... *G05B 19/41875* (2013.01); *G06Q 10/00* (2013.01)

(58) Field of Classification Search
CPC .......... G01N 3/20; G01R 31/01; H04L 9/083
USPC ................. 700/110; 235/438–441, 380, 492; 726/26
See application file for complete search history.

(56) References Cited

U.S. PATENT DOCUMENTS

| | | | |
|---|---|---|---|
| 6,394,346 B1* | 5/2002 | Bonneau, Jr. ............ | G01N 3/20 235/380 |
| 6,402,028 B1* | 6/2002 | Graham, Jr. ......... | G06Q 20/341 235/380 |
| 2004/0069845 A1* | 4/2004 | Goldstein .............. | G06K 17/00 235/380 |
| 2012/0047716 A1 | 3/2012 | Meeker et al. | |

FOREIGN PATENT DOCUMENTS

| | | |
|---|---|---|
| EP | 0680231 | 11/1995 |
| WO | 0127587 | 4/2001 |

* cited by examiner

*Primary Examiner* — Mohammad Ali
*Assistant Examiner* — M D Azad
(74) *Attorney, Agent, or Firm* — Slater Matsil, LLP

(57) ABSTRACT

A method for the serial personalization of smart cards in a production chain includes a phase of detecting a smart card already personalized and physically defective, and a phase of retrieving a serial number of the physically defective smart card, to be assigned to a smart card not yet personalized in the production chain. The physically defective smart card and the smart card not yet personalized are loaded together in the production chain wherein the physically defective smart card is rendered unusable, and the not yet personalized smart card receives the serial number retrieved from the physically defective smart card.

16 Claims, 1 Drawing Sheet

METHOD FOR SERIAL PERSONALIZATION OF SMART CARDS

FIELD OF THE INVENTION

The present invention relates to a method and system for serial personalization of smart cards, including a phase of storing a serial number in each smart card, and a phase of detecting whether a smart card already storing the serial number is physically defective or not.

BACKGROUND OF THE INVENTION

As known, a method for serial personalization is executed to store data in smart cards, and, more particularly, to store a unique serial number for identifying those smart cards.

According to a known method for serial personalization a plurality of smart cards are loaded on a conveyor belt whereon one or more programming heads are operative to electrically contact the smart cards and store the logical serial numbers. Such methods also execute a physical check of the programmed smart cards, verifying the shape of the cards and their compliance with predetermined form factors, but also their graphical layout, discarding the smart cards which are physically defective, i.e. the smart cards which are electrically working, but which cannot be delivered to the consumer due to their defective layout or other physical defects.

The phase of checking is executed after storing the serial number in the smart card, since the graphical layout or form factor might also be damaged for a wrong contact with the programming head which stores the serial number and potentially due to any operation preceding the delivery of the smart cards. A physically defective smart card is discarded and its serial number is recovered and assigned to another smart card to be personalized.

The method above described suffers from some problems. First of all, the smart card whose serial number is assigned to another smart card might be reused, whether it is not physically or electrically rendered unusable. In this respect, the known method delivers the physically defective smart card to a separate output collector with respect to the other smart cards, and a human operator might pick up the physically defective smart card from the separate output collector, before it is render unusable. In this case, two smart cards with a same logical serial number may exist.

On the other hand, it is not typically permitted to render unusable a physically defective smart card without assigning its number to another smart card. This is so since a customer, who requires serial personalization, expects that a supplier who is responsible of such serial personalization, delivers all the smart cards with the serial numbers that the customer provided before production.

The problem is how to avoid a duplication of smart cards with same serial numbers in a method and system for serial personalization, thus improving the security and at the same time the performance of such a method and system, and overcoming the limits that currently affect the prior art method and system.

SUMMARY OF THE INVENTION

The present embodiments detect physically defective smart cards and assign their serial numbers to other smart cards in a personalization system. The assignment is executed rendering really unusable the physically defective smart cards before their drop off from the personalization system. A duplication of a smart card is avoided because the assignment to a not yet personalized smart card of the serial number of the physically defective smart card is executed when both the smart cards are loaded and handled on the personalization system.

According to the approach described above, the problem is addressed by a method for serial personalization of smart cards in a production chain, comprising a phase of detecting a smart card already personalized and physically defective, and a phase of retrieving a serial number of the physically defective smart card, to be assigned to a smart card not yet personalized in the production chain characterized in that the physically defective smart card and the smart card not yet personalized are loaded together in the production chain. The physically defective smart card is rendered unusable and the not yet personalized smart card receives the serial number retrieved from the physically defective smart card.

The physically defective smart cards are dropped off from the production chain and discarded only after being rendered unusable, and after their corresponding serial number have been assigned to other smart cards in the production chain.

Mechanical or electrical means or circuitry is provided to render unusable a smart card in the production chain when another smart card is personalized with the corresponding serial number. Advantageously, duplication is avoided because the assignment of the serial number to another smart card and a destruction of the physically defective smart are executed contemporaneously in the production chain. Advantageously, the physically defective smart cards are rendered unusable before being dropped off from the production chain, so that they cannot be recovered or reused after unloading.

The production chain may comprise an input loader of smart cards not yet personalized, and an output collector of personalized smart cards.

In one aspect, the output collector comprises a separate output collector of physically defective smart cards which is connected to a separate input loader of the physically defective smart cards. In this aspect, the physically defective smart cards are not removed from the production chain, i.e. they remain in loop inside the production chain, until their serial number is retrieved and assigned to other smart cards not yet personalized. More particularly, only when the serial number is assigned, the corresponding physically defective smart cards are rendered unusable and discarded, exiting from the production chain.

In case a smart card is delivered to the output collector, since it has been already personalized and not identified as physically defective along the production chain, it may happen that it is afterwards detected to be defective, for example with a manual check of a human operator. In this respect, the method for serial personalization also provides that the smart cards detected to be defective outside the production chain, are reintroduced in the input loader and processed again for a controlled duplication. In an aspect, a separate input loader may be provided for loading the smart cards manually detected to be defective. In an embodiment, the step of scanning such smart cards for detecting physical defects is skipped and their serial number is retrieved and assigned to smart cards not yet personalized in the production chain; then the smart cards manually detected to be defective are rendered unusable.

Once the serial number of the physically defective smart card is assigned and the smart card has been rendered unusable, this last is conveyed to an output collector or waste collector, to be definitively discarded. The waste collector is physically separated from the other outputs and the smart cards delivered to the collector are not introduced in the production chain. In one aspect, the step of retrieving the serial number of the physically defective smart card is executed with a reading head placed downstream in the chain with respect to a programming head storing the serial number in the physically defective smart card. Preferably, the step of retrieving the serial number is selectively executed on the smart card detected to be physically defective and skipped on the other smart cards already personalized, these last directly proceeding to the output collector. According to this aspect, the personalization process is speeded up.

In another aspect, the step of retrieving the serial number of the physically defective smart card is executed with a same programming head storing the serial number in the physically defective smart card, wherein the physically defective smart card is passed twice under the programming head, i.e. a first time to the store the serial number and a second time for its retrieval. Preferably, also in this aspect, the step of retrieving the serial number is selectively executed on the smart card detected to be physically defective and skipped on the other smart cards for speeding up the personalization process in the whole chain.

More particularly, the method comprises a step for scanning a smart card in the chain and comparing a scanned image of the smart card with a reference image, wherein the smart card is marked or detected as a physically defective smart card when the reference image is different from the scanned image. The step of scanning comprises taking a picture of the smart card. Preferably, the step of scanning is executed as one of the last steps of the personalization process, more preferably after storing the serial number, since each contact of the smart cards with reading or programming heads or means of the production chain might potentially damage the physical or graphical layout. In one embodiment, a scanning head is interposed between the programming head and the reading head, this last being programmed to read the serial number only whether the scanning head returns an image different from the reference image.

According to another aspect, the serial numbers of the physically defective smart card are stored in a device of the production chain and assigned to the not yet personalized smart cards in the production chain. The device is programmed to discard the serial numbers, when the corresponding physically defective smart card is destroyed and another smart card is personalized with such serial number.

The physical defect of the smart card may include a non compliance to a predetermined graphical layout or form shape or contacts printing associated with the reference image.

The problem described is also addressed by a system for serial personalization of smart cards in a production chain according and comprising means or circuitry for retrieving serial numbers of a physically defective smart card already personalized, to be assigned to a smart card not yet personalized in the chain, characterized by further comprising means for rendering unusable the physically defective smart card and means for assigning the retrieved serial numbers to the smart card not yet personalized. The means or circuitry for retrieving and for assigning being operative together on the physically defective smart card and on the smart card not yet personalized.

BRIEF DESCRIPTION OF THE DRAWINGS

Further advantages and features of the method and system according to the present invention, will be apparent from the description given for exemplificative and non limitative purpose with reference to the some drawings.

DETAILED DESCRIPTION OF THE PREFERRED EMBODIMENTS

Figure 1:
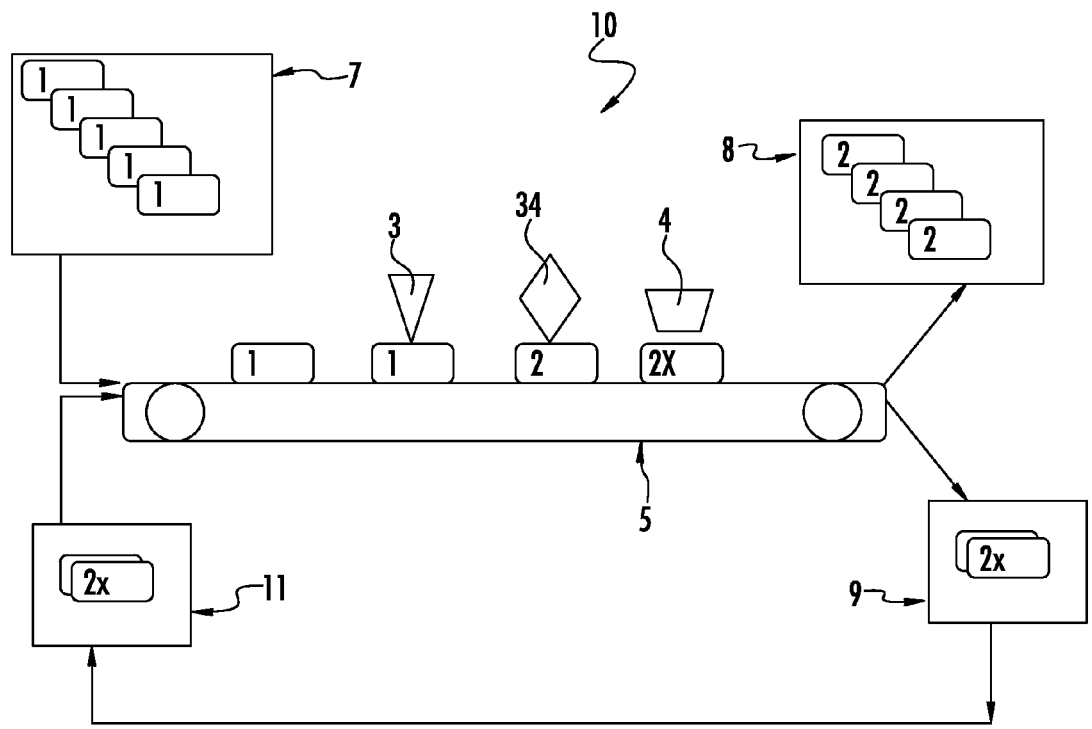
FIG. 1 schematically represents in a block diagram the method of personalizing smart card according to the present invention.

With reference to FIG. 1, a system for personalizing smart card according to the present embodiments is schematically presented including an input loader wherefrom a plurality of smart cards 1 to be personalized may be loaded for receiving a serial number to be stored in memory.

The personalization system is also indicated in the following description as production system or production chain 10, since a plurality of means or heads for personalizing the smart card are disposed to form a production chain, wherein each mean or head executes a specific step of the method according to the invention. Moreover, such method is described for personalizing smart cards only for purposes or illustration, but it is available to also personalize integrated circuit (IC) cards or subscriber identity module (SIM) cards and similar portable devices which are identifiable from a unique logical serial number in memory, and thus the term smart cards also covers such portable devices.

The production system or production chain 10 in FIG. 1 comprises a conveyor belt 5 and the input loader 7 of the smart card not yet personalized, and more particularly of smart card not yet storing a serial number, also referenced with numeral reference 1. One or more programming heads or stations 3, 4 are associated with the conveyor belt 5, to electrically contact the smart cards 1 and to read or write data, including the serial number, along the production chain.

Figure 2:
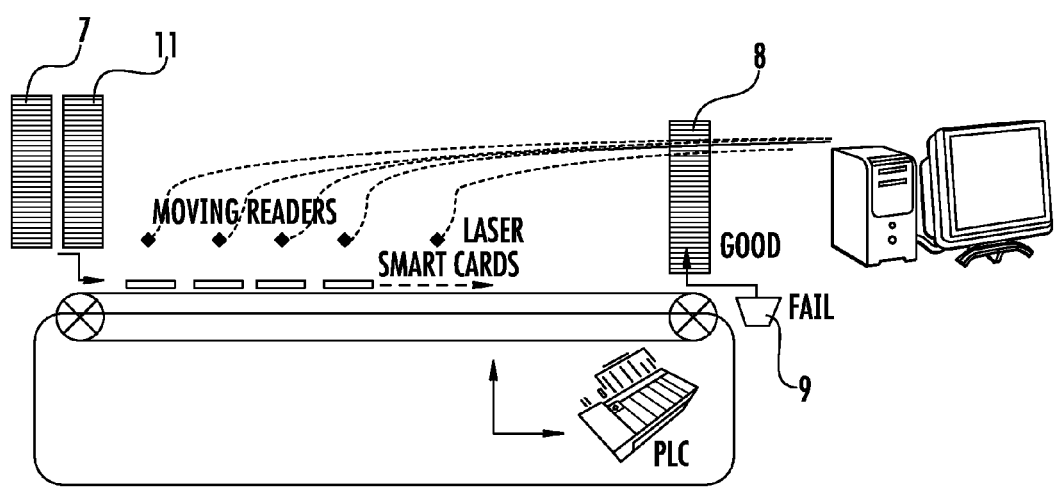
FIG. 2 is a different schematic view representing the method of personalizing smart card according to the present invention.

Of course, the production system or production chain 10 may be based on different devices and stations, for example, on a static belt and one or more programming heads moving along the belt to electrically contact the smart cards, as schematically represented in FIG. 2.

Again with reference to the FIG. 1, the smart card already personalized is distinguished with numeral reference 2 with respect to not yet personalized smart cards 1, and are delivered into an output collector 8 of the production chain 10, after being programmed by the programming head 3. In this respect, the production chain 10 also comprises a head or station 34 for checking the graphical layout and/or physical structure of the personalized smart card, in order to avoid a delivery of physical defective smart cards 2x into the output collector 8. A separate collector 9 is provided to receive the physical defective smart cards 2x.

According to the illustrated embodiments, the physically defective smart cards 2x are not dropped off or discharged from the production chain or system 10 but are maintained in the production chain 10, until their serial number is assigned to another smart card on the chain. In one embodiment, the physically defective smart cards are input again on the conveyor belt 5 with an input loader 11 connected to the output 9, after being detected as defective. More particularly, the serial number of the physical defective smart card 2x is retrieved and it is assigned to another smart card 1 not yet personalized, coming from the input loader 7 and, at the same time, the physical defective smart card 2x on the conveyor belt is rendered really unusable, thus avoiding duplication of smart cards or gaps in the assignment of serial numbers.

A device for rendering unusable the physically defective smart card 2x is included in the production chain 10 and preferably includes means for physically or electrically breaking the smart cards, for example a press or cutter of the smart card plastic board and electric components, including the memory, or a laser or electrical means or circuitry which electrically erase or definitively damage the smart card memory.

Advantageously, the physically defective smart cards 2x remain in loop in the production chain 10, until the corresponding serial numbers are assigned to other smart cards. Preferably, the step of rendering unusable and the step of assigning a serial number are executed contemporaneously in the production chain 10, respectively, on a physically defective smart card 2x and on a smart card 1 not yet personalized. According to this embodiment, the serial number is always assigned to only one smart card at a time and the existence of two or more smart cards with same serial numbers is avoided.

Once the serial number of the physically defective smart card is assigned and the smart card has been rendered unusable, this last is conveyed to an output collector or waste collector, to be definitely discarded. The waste collector is physically separated from the outputs 8 and 9 and the smart cards delivered to the waste collector are not introduced in the production chain.

The heads of the production chain include a programming head 3 for writing data to the cards, including the serial number, and a reading head 4, preferably placed downstream the programming head, to read the serial number. More preferably, between the programming head and the reading head, the head for checking 34 is placed. In an aspect, the head for checking 34 is a scanning head 34, which takes a picture of the personalized smart card 2 or 2x, to check whether the personalized smart card is a physically defective smart card 2x or not.

Preferably, the scanning head 34 takes a picture of each smart card without contacting the smart cards 2, 2x, and thus does not damage the physical structure or graphical layout of such cards. In this respect, the scanning head is placed at the end of the conveyor belt 5 and takes the picture after all the other stations 3, 4 along the production chain 10 have contacted the smart card and potentially damaged their physical or graphical layout.

The image scanned is compared to a reference image and the card is treated as a physically defective smart card, when a difference is detected between the scanned image and reference image.

For example, again with reference to FIG. 1, a smart card 2x loaded on the conveyor belt 5 has been identified as physically defective. Such a physically defective smart card 2x may be on the conveyor belt 5 because it has been loaded for the first time, programmed with the programming head 3 and scanned with the scanning head 34 or because it has been reloaded one or more times, through the input loader 11. The smart card 2x is under the reading head 4 while another smart card 2 is detected as a not defective smart card 2 under the scanning head 34, and a smart card not yet personalized is under the programming head 3.

According to the method, the physically defective smart card 2x is destroyed, passing under the means for physically or electrically destroying the memory, and its serial number is assigned from the programming head 3 to the smart card 1. In one embodiment, the reading head 4 transmits a command to the programming head 3 for programming the smart card 1 and, at the same time, a command to the means for physically or electrically destroying the smart card 2x. Preferably, the reading head 4 sends these commands after receiving from the programming head 3 a signal which is transmitted when a smart card not yet personalized is available.

Advantageously, the method and system, avoid a duplication of smart cards, i.e. a duplication of smart cards storing a same serial number. The physically defective smart card is rendered unusable inside the production chain which also assigns the serial number of the physically defective smart card, thus avoiding gaps in the serial numbers used for personalization.

Advantageously, the graphically defective smart card and the smart card not yet initialized are processed contemporaneously on the production chain so that the assignment of the serial number of the graphically defective smart card to the not yet initialized smart card are swapped, and with a physical or electrical damage of the graphically defective smart card, rendering this last smart card unusable.

That which is claimed:

1. A method for serial personalization of smart cards in a production chain comprising a reading head, a scanning head, a programming head, and an input loader, the method comprising:
   scanning a smart card in the production chain using the scanning head and comparing a scanned image of the smart card with a reference image to detect a physically defective smart card already personalized by the programming head;
   retrieving by the reading head a serial number of the physically defective smart card, the serial number being a unique number assigned to a customer requiring personalization;
   loading together the physically defective smart card and a smart card not yet personalized in the production chain using the input loader;
   transmitting a first command to render the physically defective smart card unusable by erasing or damaging a memory of the physically defective smart card, wherein a physical defect of the physically defective smart card includes at least one of a non-compliance to a graphical layout, a form shape, and a contacts printing associated with the reference image; and
   transmitting a second command to the programming head to assign the serial number from the physically defective smart card to the not yet personalized smart card at the same time with the first command.

2. The method according to claim 1, wherein the physically defective smart card stays in the production chain, until the serial number is assigned.

3. The method according to claim 1, wherein the serial number of the physically defective smart card is retrieved with the reading head placed downstream in the production chain with respect to the programming head for storing serial numbers.

4. The method according to claim 1, wherein the serial number of the physically defective smart card is retrieved with a same programming head storing the serial number; and wherein the physically defective smart card is passed at least twice under the programming head.

5. The method according to claim 1, wherein the serial number of the physically defective smart card is stored in a memory device of the production chain and assigned to the smart card not yet personalized when the physically defective smart card is rendered unusable.

6. The method according to claim 1, wherein the production chain comprises a conveyor belt, the input loader of smart cards to be personalized at an input of the conveyor belt, and an output collector of smart cards personalized and not physically defective; and wherein the physically defective smart card is delivered to a separate output collector which is coupled to a separate input loader in the production chain.

7. A method for serial personalization of smart cards in a production chain comprising a scanning head, and a programming head, the method comprising:
scanning a smart card in the production chain using the scanning head and comparing a scanned image of the smart card with a reference image to detect a physically defective smart card already personalized by the programming head;
retrieving a serial number of the physically defective smart card, the serial number being a unique number assigned to a customer requiring personalization;
loading together the physically defective smart card and a smart card not yet personalized in the production chain;
transmitting a first command to render unusable the physically defective smart card by erasing or damaging a memory of the physically defective smart card, wherein a physical defect of the physically defective smart card includes at least one of a non-compliance to a graphical layout, a form shape, and a contacts printing associated with the reference image; and
transmitting a second command to the programming head to assign the serial number from the physically defective smart card to the not yet personalized smart card at the same time with the first command while the physically defective smart card stays in the production chain until the serial number is assigned using the programming head.

8. The method according to claim 7, wherein the serial number of the physically defective smart card is retrieved with a reading head placed downstream in the production chain with respect to the programming head for storing serial numbers.

9. The method according to claim 7, wherein the serial number of the physically defective smart card is retrieved with a same programming head storing the serial number; and wherein the physically defective smart card is passed at least twice under the programming head.

10. The method according to claim 7, wherein the serial number of the physically defective smart card is stored in a memory device of the production chain and assigned to the smart card not yet personalized when the physically defective smart card is rendered unusable.

11. The method according to claim 7, wherein the production chain comprises a conveyor belt, an input loader of smart cards to be personalized at an input of the conveyor belt, and an output collector of smart cards personalized and not physically defective; and wherein the physically defective smart card is delivered to a separate output collector which is coupled to a separate input loader in the production chain.

12. An apparatus for serial personalization of smart cards comprising:
a production chain having a scanning head, a reading head, and a programming head;
the production chain configured to
scan a smart card in the production chain using the scanning head and compare a scanned image of the smart card with a reference image to detect a physically defective smart card already personalized by the programming head,
retrieve by the reading head a serial number of the physically defective smart card, the serial number being a unique number assigned to a customer requiring personalization,
load together the physically defective smart card and a smart card not yet personalized in the production chain,
transmit a first command to render unusable the physically defective smart card by erasing or damaging a memory of the physically defective smart card, wherein a physical defect of the physically defective smart card includes at least one of a non-compliance to a graphical layout, a form shape, and a contacts printing associated with the reference image, and
transmit a second command to assign the serial number from the physically defective smart card to a not yet personalized smart card at the same time with the first command while the physically defective smart card stays in said production chain until the serial number is assigned using the programming head.

13. The apparatus according to claim 12, wherein the programming head is configured to store serial numbers.

14. The apparatus according to claim 12, wherein the programming head is configured to store the serial number of the physically defective smart card; and wherein said production chain is configured to pass the physically defective smart card at least twice under said programming head.

15. The apparatus according to claim 12, wherein said production chain is configured to store the serial number of the physically defective smart card.

16. The apparatus according to claim 12, wherein said production chain comprises:
a conveyor belt;
an input loader of smart cards to be personalized associated with said conveyor belt;
an output collector of smart cards personalized and not physically defective associated with said conveyor belt; and
another output collector associated with said conveyor belt wherein the physically defective smart card is delivered thereto.

* * * * *